(12) United States Patent
Gale et al.

(10) Patent No.: US 7,679,336 B2
(45) Date of Patent: Mar. 16, 2010

(54) INTERACTIVE BATTERY CHARGER FOR ELECTRIC VEHICLE

(75) Inventors: Allan R. Gale, Livonia, MI (US); Michael W. Degner, Novi, MI (US)

(73) Assignee: Ford Global Technologies, LLC, Dearborn ( * ) Notice: Subject to any disclaimer, the term of this patent is extended or adjusted under 35 U.S.C. 154(b) by 596 days.

(21) Appl. No.: 11/711,270

(22) Filed: Feb. 27, 2007

(65) Prior Publication Data

US 2008/0203973 A1    Aug. 28, 2008

(51) Int. Cl.
*H02J 7/04*  (2006.01)
*B60K 1/00*  (2006.01)
*B60K 6/20*  (2006.01)
*G05B 11/01* (2006.01)

(52) U.S. Cl. .................. 320/155; 180/65.1; 180/65.21; 700/22; 903/907

(58) Field of Classification Search ......... 320/155–157; 903/907; 700/22; 180/65.1, 65.21
See application file for complete search history.

(56) References Cited

U.S. PATENT DOCUMENTS

| | | | |
|---|---|---|---|
| 5,467,006 A | 11/1995 | Sims | |
| 5,563,491 A | 10/1996 | Tseng | |
| 5,642,270 A * | 6/1997 | Green et al. | .................. 363/17 |
| 5,650,710 A * | 7/1997 | Hotta | ......................... 320/128 |
| 5,696,367 A | 12/1997 | Keith | |
| 5,803,215 A | 9/1998 | Henze et al. | |
| 2006/0244411 A1 | 11/2006 | Wobben | |

\* cited by examiner

*Primary Examiner*—Edward Tso
*Assistant Examiner*—Richard V Muralidar
(74) *Attorney, Agent, or Firm*—David B. Kelley; MacMillan, Sobanski & Todd, LLC

(57) ABSTRACT

A method for recharging an electric storage battery in the charging system of an electric vehicle from an electric utility power grid includes determining the length of time required to recharge the battery, determining the desired time when the recharge is to be completed, transmitting to the electric power utility the length of time required to recharge the battery and the desired time, and recharging the battery from the utility grid during a period when projected load demand is lower than peak demand and ending no later than the desired time.

18 Claims, 5 Drawing Sheets

INTERACTIVE BATTERY CHARGER FOR ELECTRIC VEHICLE

BACKGROUND OF THE INVENTION

1. Field of the Invention

The preferred embodiment relates generally to a system and method for recharging an electric storage battery located onboard a vehicle driven at least in part by electric energy.

2. Description of the Prior Art

A hybrid vehicle is a vehicle that uses two distinct power sources, such as an on-board rechargeable energy storage system and a fueled power source for vehicle propulsion. The term hybrid vehicle most commonly refers to hybrid-electric vehicle (HEV), which use internal combustion engines and electric batteries to power electric motors. Generally, kinetic energy of the vehicle is recovered during braking, converted to electric energy and stored in one of the batteries.

A plug-in hybrid electric vehicle (PHEV) is a hybrid, which has additional battery capacity and the ability to be recharged from an external electrical outlet supplied by a public utility power grid. The vehicle can be used for short trips of moderate speed without needing the internal combustion engine (ICE) component of the vehicle's power train, thereby saving fuel costs. In this mode of operation, the vehicle operates as a pure battery electric vehicle, but the long range and additional power of the ICE power train is available when needed. PHEVs are commonly called "grid-connected hybrids."

With the development of plug-in hybrid electric vehicles and other plug-in electric vehicles, the demand on the utility grid power can be significant and can cause large peak power loads and transients for the utility. To support these conditions, the utility must keep power plants on line that can respond quickly to these transients and peaks. These fast response power plants are typically less efficient than the slower responding power plants. During off hours, for example during the night, the fast response power plants can be idled, reducing their cost of operation. The lower-cost, high quality power on the grid from the larger, slower response power plants during the off hours is often underutilized. If the peak loads can be reduced and better balanced through the day, the cost of power would be reduced, thereby improving the profit margin of the utility and/or the end user.

Charging systems for PHEVs monitor the magnitude of electric energy required to fully charge the battery and compute the duration and load that will put on the utility grid while performing the charging. The user can provide information to the charging system indicating when the battery charge must be completed. Alternatively the system could learn the driver's habits and make the best judgment about the charging variables.

SUMMARY OF THE INVENTION

A method for recharging an electric storage battery in the charging system of an electric vehicle from an electric utility power grid includes determining the length of time required to recharge the battery, determining the desired time when the recharge is to be completed, transmitting to the electric power utility the length of time required to recharge the battery and the desired time, and recharging the battery from the utility grid during a period when projected load demand is lower than peak demand and ending no later than the desired time.

A system for recharging an electric storage battery of the vehicle includes an electric power utility that controls the supply of electric power, a power grid on which electric power is transmitted, a charger electrically connected to the power grid and the battery, and a controller electrically connected to the charger and the battery and communicating with the electric power utility, the controller determining the length of time required to recharge the battery, determining the desired time when the recharge is to be completed, and transmitting to the electric utility the duration the recharge and the desired time.

Information regarding the magnitude of electric energy required to fully charge the vehicle's battery, the duration and load that will put on the utility grid while performing the charging, and user's preferred time to complete the charge, can be transmitted to the electric utility or a user power control center. The utility can use the information to optimize its plant usage by knowing the future load demand or direct the vehicle charge cycle timing to optimize the grid and power plant use. The benefits to the user and utility result in lower cost electric power for the user and better plant use by the utility. If the information is used by a home power center, it is becoming common for the cost of power to the user to vary based on utility load. The charge information could be used to obtain the lowest cost vehicle charge for the user.

The charge system better optimizes the utility load through the entire day instead of using interruptible power which only optimizes the load during high utility power peaks.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
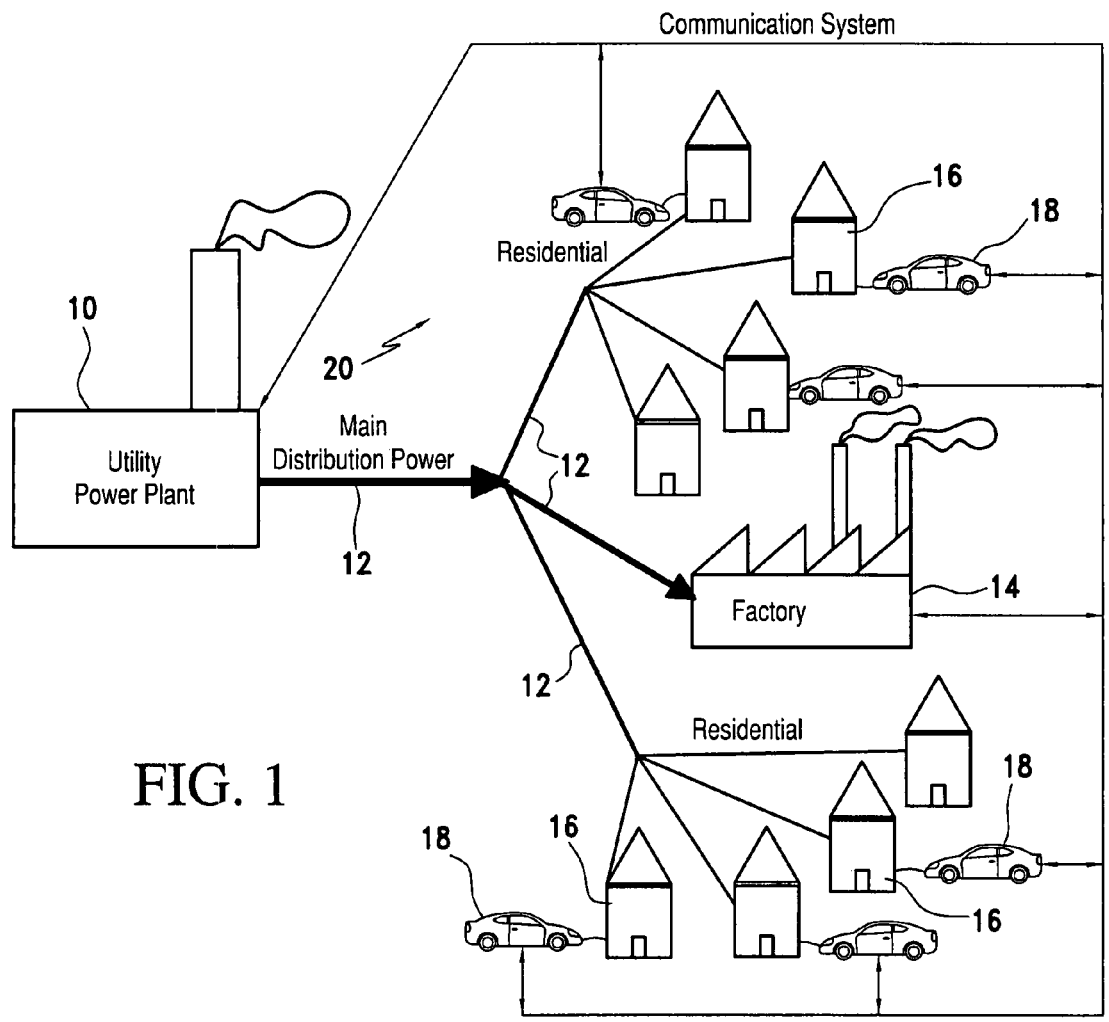
FIG. 1 is a schematic diagram showing a utility grid and a system for bidirectional communications between an electric power utility and a PHEV user.

Turning first to FIG. 1, an electric utility power plant 10 distributes power on a grid 12 to its customers located at factories 14, commercial facilities and homes 16, where some utility customers recharge batteries of electric vehicles including PHEVs 18. A communication system 20 linking the customers and the utility 10 carries bidirectional transmissions to and from battery charging systems 22 located on board each PHEV 18.

Figure 2:
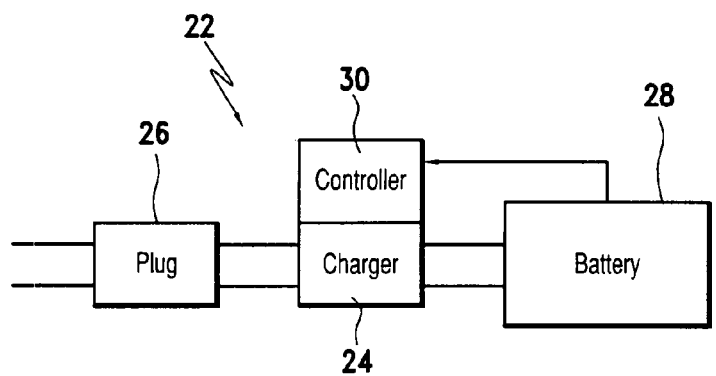
FIG. 2 is schematic diagram of a battery charging system.

The PHEV battery charging system 22 shown in FIG. 2 includes a plug-in charger 24, equipped with plugs adapted for insertion into a conventional electrical receptacle 26 connected to the power grid 12, an electric storage battery 28, and a controller 30 electrically connecting the charger 24 and battery 28 and communicating bi-directionally through the charger with the electric utility 10. Controller 30 continually monitors the current state of charge (SOC) of the onboard electric storage battery 28, has access to electronic memory containing a maximum time rate at which the battery can be charged through the charger 24, and calculates the required time to recharge the battery at the maximum rate or any other charge rate. Controller 30 initiates communications transmitted through the charger 24 to the electric utility 10 and responds to communications from the utility. Such communication may be transmitted on the grid or by any other suitable means such as by a telecommunications system.

The user can input information to the controller regarding a requested recharge of the battery 28, such as the desired time when the recharge is to be completed. In response to information from the electric utility 10 and instruction from the user, controller 30 controls the charger 24 to recharge the battery 28.

Figure 3:
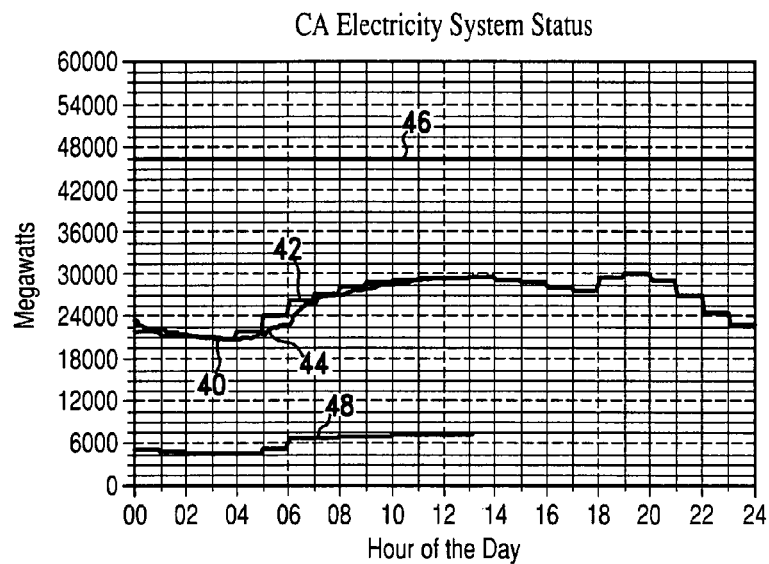
FIG. 3 is a graph showing the load status of an electric utility grid system during a typical weekday.

Utility power flow varies by time of day, month and year. FIG. 3 shows that the lowest electric energy load 40 on the California grid for Oct. 5, 2006, was predicted to occur at about 3:00 AM. The projected magnitude of electric power drawn 42 from an electric utility grid and the current load 44 actually drawn are monitored by electric utilities in order to optimize operation of their power plants with reference to maximum capacity 46 and net imported power 48. If leveling the load on the grid is desired, the interval between 2200 hrs and 0600 hrs represents an ideal time for charging the battery of a PHEV 18, and the interval between 0800 hrs and 2100 hrs would be the least desirable time interval for the California power grid on Oct. 5, 2006.

Wider fluctuations in power draw can occur in local areas such as residential areas where evening consumption is high and commercial consumption is low. These fluctuations when added together produce the graph of FIG. 3.

Load leveling on the grid has positive benefits to the utility, consumer and environment. The most efficient, lowest cost per kW-hr power plants are typically slow to respond to hourly load changes, but the less efficient, higher cost per kW-hr can often respond quickly. This dichotomy requires the utility to maintain or have access to fast response power plants to handle the peak daytime loads shown in FIG. 3.

During the night, when the load falls below the power output of even the slow response power plants, the utility produces excess power even after idling the fast response plants, which power is sold on the grid to other utilities at a large discount. When high power magnitudes of power are being consumed, the utility may not be able to meet its needs and must pay other utilities a premium for additional power. For example, if the load at the 7:00 PM is 30000 megawatts peak power, the cost is considered to be 1 p-u (100%). At 3:00 AM when the load is 21000 megawatts, the cost per kW-hr would be 70% of the peak power cost, a 1.43:1 ratio. But the actual cost ratio between peak load cost and minimum cost can vary by 110:1.

The PHEVs are intended to be recharged from household power outlets. The typical charger interconnecting the power grid and the vehicle charging system is expected to recharge the battery at a rate of around 1 kW due to the limitations of the outlet and its fused circuit.

A PHEV 18 charging system includes a battery 28 with a capacity of about 10 kW-br and may require 10 hours to be fully recharged. If the PHEV charging system 22 were plugged in to the power grid 10 when the battery 28 is only partially discharged the length of the period required to fully recharge the PHEV would be less than 10 hours.

Power supplied by the grid 10 to the charging system 22 can be controlled to optimize grid use if the grid 10 and charger 24 share important information. Likewise information from the grid 10 relating to power consumption costs during the recharge period can be used to lower the user's recharge costs. For example, when the PHEV charging system 22 is electrically connected to the power grid 10, the charging system communicates to the grid the number of kW-hrs needed to charge the battery and the required completion time of the recharge. The recharge completion time is entered by the user or by an adaptive algorithm that uses historical drive cycle information to make a best judgment. The shared information is then used to determine the time of the recharge, duration of the recharge, power use rate, and cost to recharge the battery 28.

Figure 4:
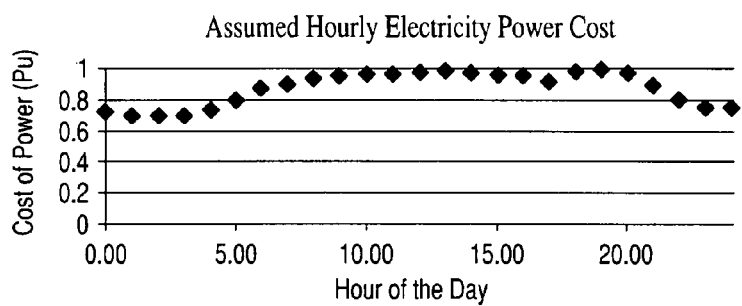
FIG. 4 illustrates the variation with time of day of the cost per-unit of electric power on the grid.

Although the cost of energy on the grid 10 can vary for many reasons, the cost of energy may be assumed to vary inversely proportional with the peak grid power. FIG. 4 shows the variation of the per-unit (p-u) power flow on the grid, i.e., the cost where 1 p-u occurs at the 30000 megawatt power point in FIG. 3. FIG. 4 illustrates the variation with time of day of the cost per unit of electric power on the grid.

Figure 5:
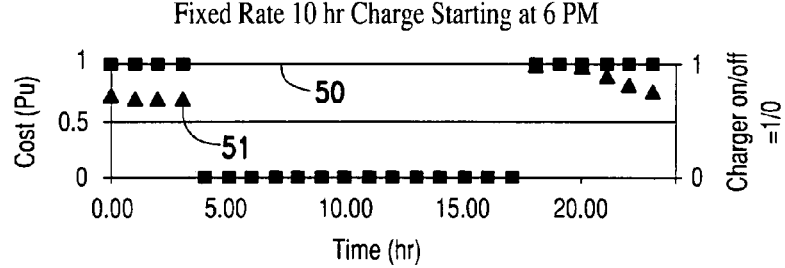
FIG. 5 is a graph of a first example that shows the charger activation time and the variation of cost when the recharge is started at 6:00 PM.
Figure 6:
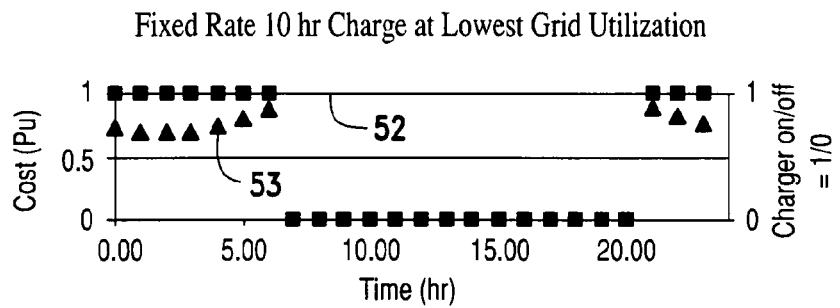
FIG. 6 is a graph of the first example that shows the charger activation time and the variation of cost when the charger is operated during the lowest cost time of the day.
Figure 7:
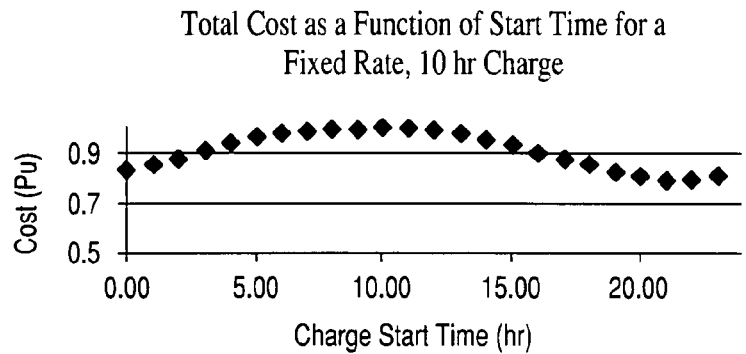
FIG. 7 is a graph of the first example that shows the variation of cost for a 10 hour recharge as a function of the starting time.

FIGS. 5-7 illustrate an example of charging the PHEV continuously at 1.0 kW/hr. for 10 hrs to achieve a 10 kW-hr charge. FIG. 5 shows the charger activation 50 and the cost 51 for charging when the battery recharge is started at 6:00 PM and ends at 4:00 AM. FIG. 6 shows the charger activation time 52 and the cost 53 of charging when the charger is operated during the lowest cost period. FIG. 7 shows the variation during one day of p-u costs for the battery charge as a function of the time when the recharge is started, called "start time." As FIG. 7 shows, the cost for the 10 hour battery recharge ranges from 79% to 100% depending on the start time. A simple communication from the grid 10 to the charger 24 and its controller 30 regarding the optimal start time would reduce the cost to 79% of the peak cost.

Figure 8:
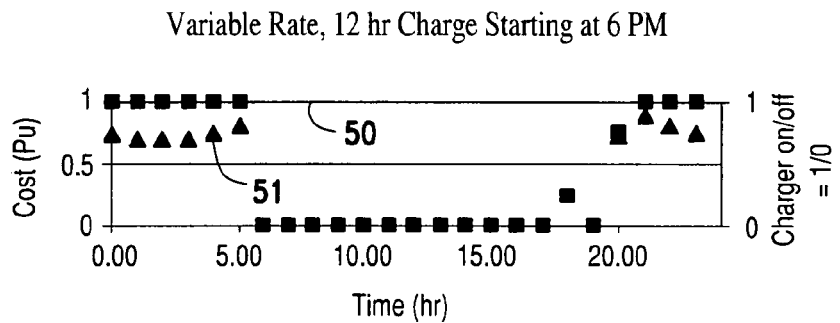
FIG. 8 is a graph of a second example that shows the charger activation time and the variation of cost for a 12 hour recharge of the PHEV battery.
Figure 9:
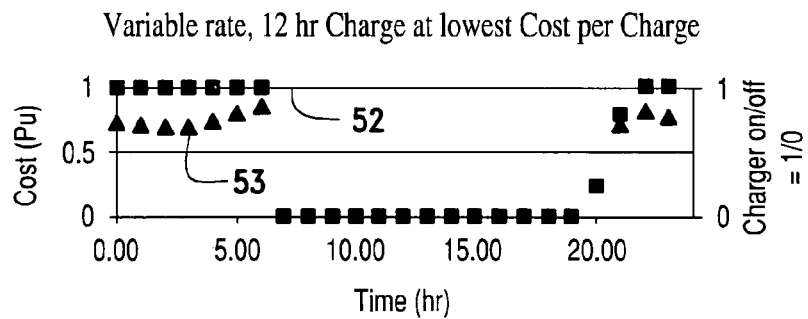
FIG. 9 is a graph of the second example that shows the charger activation time and the variation of cost when the charger is operated during the lowest cost time of the day.
Figure 10:
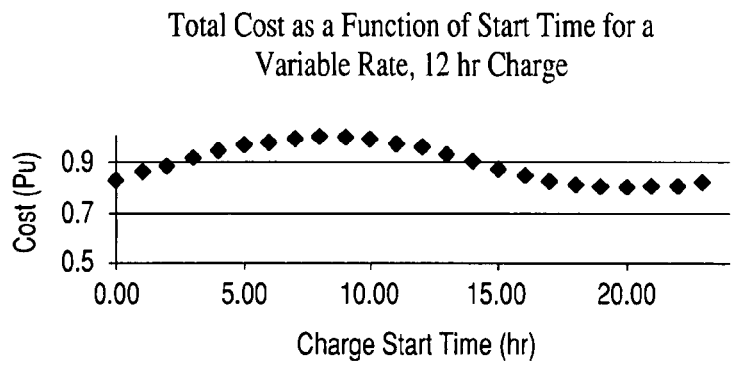
FIG. 10 is a graph of a second example that shows the variation of cost for a 12 hour recharge as a function of the starting time.
Figure 11:
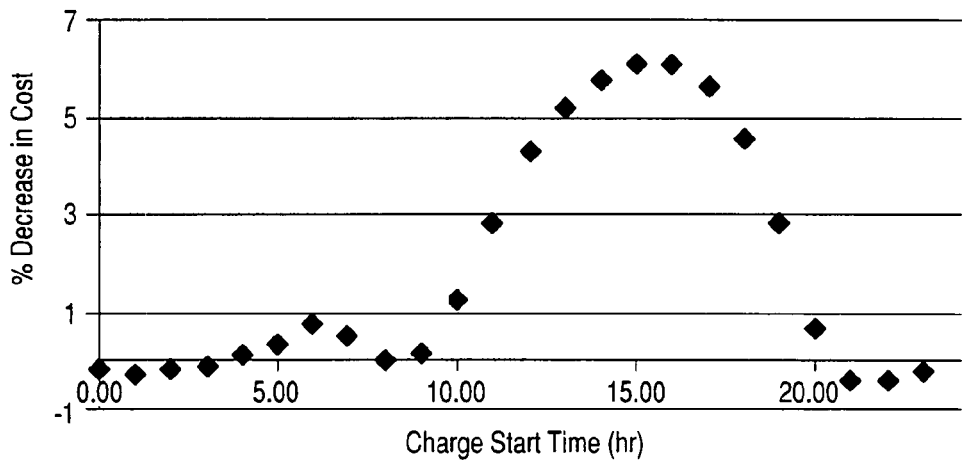
FIG. 11 is a graph that show the decrease in cost of the second example to recharge the PHEV battery compared to the first example.

FIGS. 8-10 illustrate a second example wherein the PHEV battery 28 is continuously charged at a variable rate for 12 hours and the maximum charging rate (1 kW/hr) is inversely proportional to the energy cost. FIG. 8 varies slightly from FIG. 5 after 8:00 PM (20.00 hrs). In FIG. 9 the start time and the charge rate vary more noticeably from those of FIG. 6. FIG. 10 shows that the p-u costs for the second example are similar to the p-u costs of the first example, but with a slight phase shift leftward toward the earlier hours of the day. Although FIGS. 7 and 10 look similar, FIG. 11 shows the variation with start time of the cost reduction in the second example relative to the first example. The second example would reduce the cost to recharge the PHEV battery 28 by nearly six percent compared to the first example.

While the results will change with other implementations of fixed rate and variable rate charging, the two examples of the charger 24 and the utility 10 sharing information show good potential to smooth the grid power flow and reduce cost for the utility and the user. In the first and second examples, a simplistic assumption was made that the cost of utility power is inversely proportional to the amount of power being drawn from the grid 12. While the cost assumption is simplistic, the conclusion provides directional value. Additionally, if the information provided by the utility included both regional power flow, as in FIG. 3, and local power flow, additional benefits would result at the local level.

Figure 12:
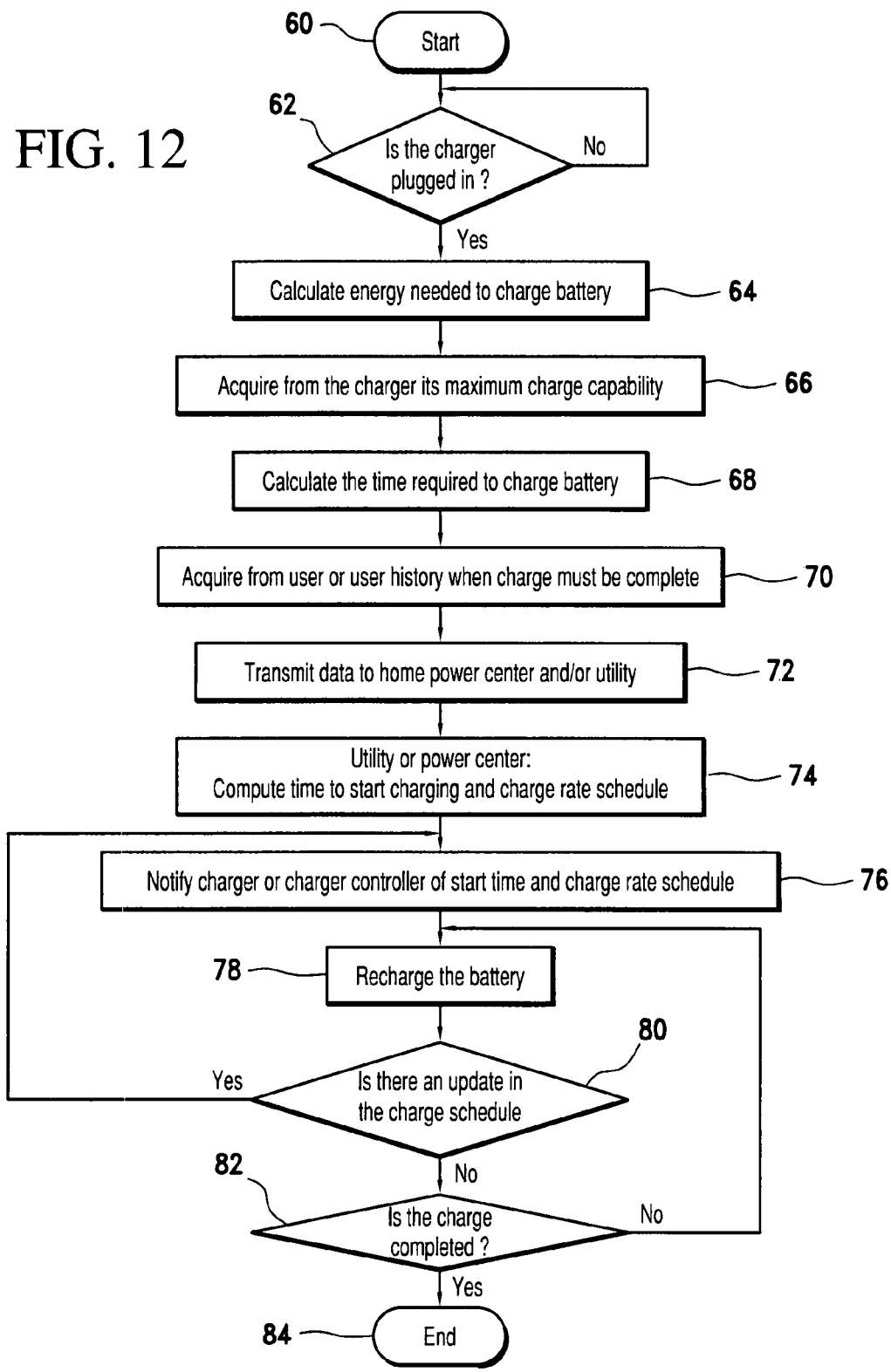
FIG. 12 is a diagram of the method steps that balance the demand on the utility grid.

Turning now to FIG. 12, a method for recharging the battery 28 is coordinated by the charging system controller 30, which may include a controller integral with the battery 28. When actuated at 60, controller 30 determines at 62 whether the charger is connected electrically to the power grid 12. If the test at step 62 is logically false, control returns to 60, but if the test is true, control passes to 64 where the controller uses the current state of charge of the battery 28 to determine the magnitude of energy required to fully recharge the battery.

At 66, controller 30 determines the charge rate that the charger 24 can provide, usually in the range 1.0-1.2 kW per hour. At 68, controller 30 uses information from steps 64 and 66 to determine the length of the period required to fully recharge the battery 28 from its current state of charge.

At 70, controller 30 determines the time when the recharge is desired to be completed, either from the user input or from a historical record of prior recharges performed for the user. At 72, the information from steps 68 and 70 is transmitted to the electric utility 10 or to a power center at which local power demand is controlled and coordinated with user requests. At 74, the time to start the desired recharge is determined, the time rate at which the battery recharge is to occur is schedule by the utility, and the cost of the recharge is determined. At 76, the utility 10 notifies the charging system controller 30 of the recharge start time, the time rate of the recharge, i.e., the magnitude of energy to draw from the utility grid per hour, and the cost of the battery recharge. At 78, controller 30 responds to step 76 by ensuring that an electrical connection between charger 24 and battery 28 is present at the start time and during the recharge period. Preferable battery 28 is recharged from the utility grid 12 during a period when projected load demand is lower than peak demand and that ends no later than the desired time for the recharge to be completed. The recharge need not be continuous but it may be interrupted periodically.

At 80 a test is made to determine whether the recharge schedule has been updated. If the test at step 80 is logically true, control returns to 76, but if the test at 80 is false, a test is made at 82 to determine whether the battery recharge is completed. If the test at 82 is false, control return to step 78 and the recharge continues. But if the test at 82 is true, the recharge is ended at 84.

Preferably, the recharge will load the grid 12 at a more uniform magnitude during off-peak periods by scheduling the recharge during periods when overall power demand would otherwise be relative low, i.e., below peak demand. The user's cost for the recharge is reduced compared to the cost if the recharge were performed during periods of higher load on the grid.

In accordance with the provisions of the patent statutes, the preferred embodiment has been described. However, it should be noted that the alternate embodiments can be practiced otherwise than as specifically illustrated and described.

What is claimed is:

1. A method for recharging an electric storage battery of a vehicle powered at least in part by electric energy from an electric utility power grid, the method comprising the steps of:
    (a) determining a magnitude of electric energy required to recharge the battery to a desired state of charge;
    (b) determining a maximum time rate at which the battery can be recharged; and
    (c) using information from steps (a) and (b) to determine a length of time required to recharge the battery;
    (d) determining a desired time when the recharge is to be completed;
    (e) transmitting information from steps (c) and (d) to the electric power utility;
    (f) recharging the battery from the utility grid during a period when projected load demand is lower than peak demand and ending no later than the desired time.

2. The method of claim 1 further comprising:
    determining a projected load on the grid during a period ending at the desired time; and
    determining a start time of the recharge from the projected load, the magnitude of electric energy required for the recharge, the length of time required to recharge the battery, and the desired time.

3. The method of claim 1 further comprising:
    determining a projected load on the grid during a period ending at the desired time; and
    determining a time rate of energy to be drawn from the grid during the recharge from the projected load, the magnitude of electric energy required for the recharge, the length of time required to recharge the battery and the desired time.

4. The method of claim 1 further comprises the steps of:
    determining the user's cost for the planned recharge; and
    transmitting from the electric power utility to the vehicle charging system the estimated cost for the recharge.

5. The method of claim 1 further comprises the steps of:
    determining the start time of the recharge; and
    transmitting from the electric power utility to the vehicle charging system the start time of the recharge.

6. The method of claim 1 further comprises the steps of:
    determining the time rate of energy to be drawn from the grid during the recharge; and
    transmitting from the electric power utility to the vehicle charging system a schedule of the electric charging rate for the recharge.

7. A system for recharging an electric storage battery of a vehicle powered at least in part by electric energy, comprising:
    an electric power utility that controls the supply of electric power;
    a power grid on which electric power is transmitted;
    a charger electrically connected to the power grid and the battery;
    a controller electrically connected to the charger and the battery and communicating with the electric power utility, the controller determining the length of time required to recharge the battery, determining the desired time when the recharge is to be completed, transmitting to the electric utility the duration of the recharge and the desired time; determining a magnitude of electric energy required to recharge the battery to a desired state of charge; determining a maximum time rate at which the battery can be charged; using the magnitude of electric energy required to recharge the battery and the maximum time rate to calculate the length of time required to recharge the battery; and communicating to the electric rower utility the length of time required to recharge the battery.

8. The system of claim 7 wherein communications between the electric power utility and the controller are transmitted.

9. The system of claim 7 wherein the electric power utility further transmits to the controller the start time of the recharge.

10. A system for recharging an electric storage battery of a vehicle powered at least in part by electric energy, comprising
an electric power utility that controls the supply of electric power;
a power grid on which electric power is transmitted;
a charger electrically connected to the power grid and the battery;
a plug-in hybrid electric vehicle including a controller electrically connected to the charger and the battery and communicating with the electric power utility, the controller determining the length of time required to recharge the battery, determining the desired time when the recharge is to be completed, transmitting to the electric utility the duration of the recharge and the desired time, determining the magnitude of electric energy required to recharge the battery to a desired state of charge; determining the maximum time rate at which the battery can be charged; using the magnitude of electric energy required to recharge the battery and the maximum time rate to calculate the length of time required to recharge the battery; and communicating to the electric power utility the length of time required to recharge the battery.

11. The system of claim 10 wherein communications between the electric power utility and the controller are transmitted.

12. The system of claim 10 wherein the electric power utility further transmits to the controller the start time of the recharge.

13. A method for recharging an electric storage battery of a plug-in hybrid electric vehicle powered at least in part by electric energy from an electric utility power grid, the method comprising the steps of:
(a) determining a length of time required to recharge the battery;
(b) determining a desired time when the recharge is to be completed;
(c) transmitting information from steps (a) and (b) to the electric power utility; and
(d) recharging the battery from the utility grid during a period when projected load demand is lower than peak demand and ending no later than the desired time;

determining the time rate of energy to be drawn from the grid during the recharge; and
transmitting from the electric rower utility to the vehicle charging system a schedule of the electric charging rate for the recharge.

14. The method of claim 13 wherein step (a) further comprises the steps of:
determining the magnitude of electric energy required to recharge the battery to a desired state of charge;
determining the maximum time rate at which the battery can be recharged; and
using information from steps (e) and (f) to calculate said length of time required to recharge the battery.

15. The method of claim 13 further comprising:
determining a magnitude of electric energy required to recharge the battery to a desired state of charge;
determining a maximum time rate at which the battery can be recharged;
calculating a length of time required to recharge the battery;
determining a projected load on the grid during a period ending at the desired time; and
determining a start time of the recharge from the projected load, the magnitude of electric energy required for the recharge, the length of time required to recharge the battery, and the desired time.

16. The method of claim 13 further comprising:
calculating said length of time required to recharge the battery by determining a magnitude of electric energy required to recharge the battery to a desired state of charge and determining a maximum time rate at which the battery can be recharged;
determining a projected load on the grid during a period ending at the desired time; and
determining a time rate of energy to be drawn from the grid during the recharge from the projected load, the magnitude of electric energy required for the recharge, the length of time required to recharge the battery and the desired time.

17. The method of claim 13 further comprises the steps of:
determining the user's cost for the planned recharge; and
transmitting from the electric power utility to the vehicle charging system the estimated cost for the recharge.

18. The method of claim 13 further comprises the steps of:
determining the start time of the recharge; and
transmitting from the electric power utility to the vehicle charging system the start time of the recharge.

* * * * *